(12) United States Patent
Poetker et al.

(10) Patent No.: US 8,213,413 B2
(45) Date of Patent: Jul. 3, 2012

(54) REAL-TIME PACKET PROCESSING SYSTEM AND METHOD

(75) Inventors: John James Poetker, Mt. Airy, MD (US); Jeffrey Allen Jones, Ijamsville, MD (US); Michael Bruce Folkart, Rockville, MD (US); Jerry Leroy Shumway, Rockville, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1993 days.

(21) Appl. No.: 11/281,882

(22) Filed: Nov. 18, 2005

(65) Prior Publication Data

US 2006/0120283 A1 Jun. 8, 2006

Related U.S. Application Data

(60) Provisional application No. 60/629,331, filed on Nov. 19, 2004.

(51) Int. Cl.
*H04L 12/66* (2006.01)
(52) U.S. Cl. ......... 370/352; 370/230; 370/356; 370/433
(58) Field of Classification Search .................. None
See application file for complete search history.

(56) References Cited

U.S. PATENT DOCUMENTS

| | | | |
|---|---|---|---|
| 6,282,192 B1 * | 8/2001 | Murphy et al. | 370/352 |
| 6,359,656 B1 | 3/2002 | Huckins | |
| 6,477,669 B1 | 11/2002 | Agarwal et al. | |
| 6,594,268 B1 | 7/2003 | Aukia et al. | |
| 6,611,531 B1 | 8/2003 | Chen et al. | |
| 6,707,821 B1 | 3/2004 | Shaffer et al. | |
| 6,754,219 B1 | 6/2004 | Cain et al. | |
| 6,801,530 B1 | 10/2004 | Brandt et al. | |
| 2001/0036190 A1 | 11/2001 | Takahashi | |
| 2002/0023089 A1 * | 2/2002 | Woo | 707/101 |
| 2002/0112073 A1 | 8/2002 | MeLampy et al. | |
| 2002/0169887 A1 | 11/2002 | MeLampy et al. | |
| 2002/0184314 A1 | 12/2002 | Riise | |
| 2003/0046330 A1 * | 3/2003 | Hayes | 709/201 |
| 2003/0081594 A1 | 5/2003 | Lee | |
| 2003/0093550 A1 | 5/2003 | Lebizay et al. | |
| 2003/0095567 A1 | 5/2003 | Lo et al. | |
| 2004/0114607 A1 | 6/2004 | Shay et al. | |
| 2004/0122981 A1 | 6/2004 | P. et al. | |
| 2004/0264488 A1 * | 12/2004 | Yoon et al. | 370/412 |
| 2006/0018657 A1 * | 1/2006 | Oron et al. | 398/66 |

FOREIGN PATENT DOCUMENTS

| | | |
|---|---|---|
| GB | 2398703 A | 8/2004 |
| JP | 2001-339428 A | 12/2001 |

OTHER PUBLICATIONS

Extended/Supplemental European Search Report for Application EP 05825050.7-2416, dated May 18, 2010.

* cited by examiner

*Primary Examiner* — Joe Cheng
*Assistant Examiner* — Justin N Mullen
(74) *Attorney, Agent, or Firm* — Rothwell, Figg, Ernst & Manbeck, P.C.

(57) ABSTRACT

In some embodiments, the invention may include a combination of real-time packet detection, processing and routing. When implemented in a distributed architecture, such systems can yield a low cost, high availability and/or secure network capable of switching real-time data and delivering the quality of service expected in mission critical systems.

30 Claims, 3 Drawing Sheets

REAL-TIME PACKET PROCESSING SYSTEM AND METHOD

This application claims the benefit of U.S. Provisional Patent Application No. 60/629,331, filed on Nov. 19, 2004, the entire contents of which are incorporated herein by reference.

BACKGROUND OF THE INVENTION

1. Field of the Invention

The present invention relates generally to the processing of packets in packet switching systems, including, e.g., TCP/IP packets. Some preferred embodiments involve audio, video and/or multimedia packet processing systems and methods.

2. Discussion of the Background

Packet switching systems have found minimal acceptance in mission critical applications. This is largely due to the fact that packet switching systems may experience low real-time data quality under heavy network loading and propagation delays due to limited network bandwidth.

In addition to network bandwidth concerns, conventional packet switched network nodes need to receive and process all network traffic to determine if the packet is of interest. To examine a packet, a node processor needs to host at least part of a network protocol software stack. In large systems, this requirement can impact the cost of network nodes because powerful microprocessors are needed to handle the processing load.

However, packet switching systems have characteristics that can be advantageous in mission critical applications. For example, such systems do not require the distribution of critical timing reference signals to all nodes to accommodate audio and real-time data distribution. In addition, illustrative packet switching systems may require only a standard type network connection between system nodes (e.g., an Ethernet connection) which can have the effect of simplifying installation, reducing infrastructure costs and significantly lowering life cycle costs.

What is desired, therefore, are systems and methods to overcome the above described and/or other limitations of packet switching nodes so that they are better suited for critical applications.

SUMMARY OF THE INVENTION

Some preferred embodiments of the invention described in this patent application overcome limitations of packet switched networks in mission critical applications. In some embodiments, the invention may include a combination of real-time packet detection, processing and routing. When implemented in a distributed architecture, such systems can yield a low cost, high availability and/or secure network capable of switching real-time data and delivering the quality of service expected in mission critical systems. These significant improvements can be accomplished using standard network protocols and infrastructure assuring compatibility with both existing networks and future deployments of packet switched systems.

A system according to one embodiment of the invention includes: a media access control layer module for receiving packet data from a network; a packet memory for storing the packet data received from the network, the packet data including packet header data; a real-time packet handler; a processor executing a protocol stack; and a packet header test module that examines the packet header data to determine whether the packet header data indicates that the payload associated with the packet header contains real-time data, wherein the header test module routes the packet data to the processor if the module determines that the packet header does not indicate that the payload contains real-time data and routes the packet data to a real-time packet handler if the module determines that the packet header indicates that the payload contains real-time data.

In some embodiments, the real-time packet handler comprises a controller for filtering and processing the packet data and a queue, coupled to a digital signal processor, for storing the filtered and processed packet data. In some embodiments, the real-time packet handler is configured to (a) determine the source address included in the packet data, (b) determine whether the source address is included in a list of predetermined source addresses; and (c) determine whether the source address is associated with an active channel, wherein the handler modifies the packet data and stores the modified packet data in said queue if the source address is associated with an active channel and the source address is included in said list of predetermined source addresses.

A method according to one embodiment of the invention includes the steps of: (a) receiving packet data from a network, the packet data comprising packet header data and packet payload data; (b) examining the packet header data; (c) determining whether the packet payload data includes real-time data based on the packet header data; (d) providing the packet data to a processor running a protocol stack if the packet payload data does not include real-time data; and if the packet payload data includes real-time data then, (e) storing the packet data in a queue coupled to a digital signal processor if the packet data passes through a filter and the source address is associated with an active channel; and (f) storing the packet data in said queue if the packet data passes through said filter and the payload of the packet data does not consist of comfort noise and/or silence.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

DETAILED DESCRIPTION OF PREFERRED EMBODIMENTS

Figure 1:
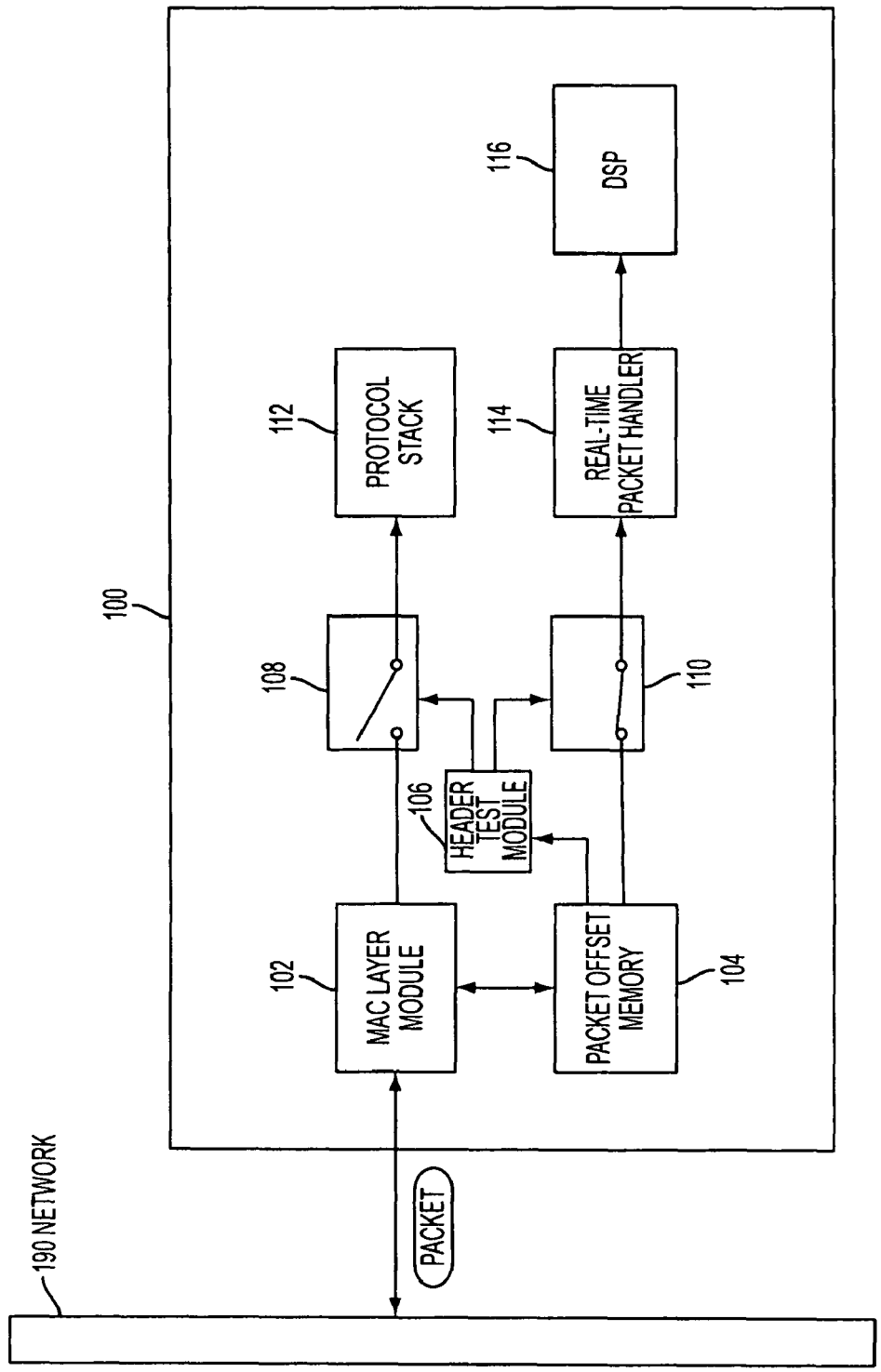
FIG. 1 is a functional block diagram of a computer system 100 according to one embodiment.

FIG. 1 is a functional block diagram of a computer system 100 according to one embodiment of the invention. System 100 includes a media access control (MAC) layer module 102. MAC layer module 102 receives packets from and transmits packets onto network 190. When MAC layer module 102 receives packet data from network 190, MAC layer module 102 forms a packet and stores the packet data in packet offset memory 104.

A header test module 106 examines the packet data stored in memory 104 to determine whether the packet being received by MAC layer 102 is a real-time packet (i.e., a packet that requires special processing). For example, header test module 106 may examine the appropriate packet header to determine if the packet contains a real-time payload (e.g., voice payload).

If header test module 106 determines, that the packet is not a real-time packet, then it closes switch 108 so that the packet can be routed to a processor (e.g., a RISC processor, a CISC processor or other processor) that is executing a conventional protocol stack 112 (e.g., a TCP/IP protocol stack) for processing. If header test module 106 determines that the packet is a real-time packet, then it closes switch 110 so that the packet can be routed to a real-time packet handler 114. Switches 108 and 110 may be hardware or software switches. Real-time packet handler 114 may be configured to filter and modify the packets that it receives and to present the filtered and modified packets to a digital signal processor (DSP) 116 that processes the payload of the packet.

Figure 2:
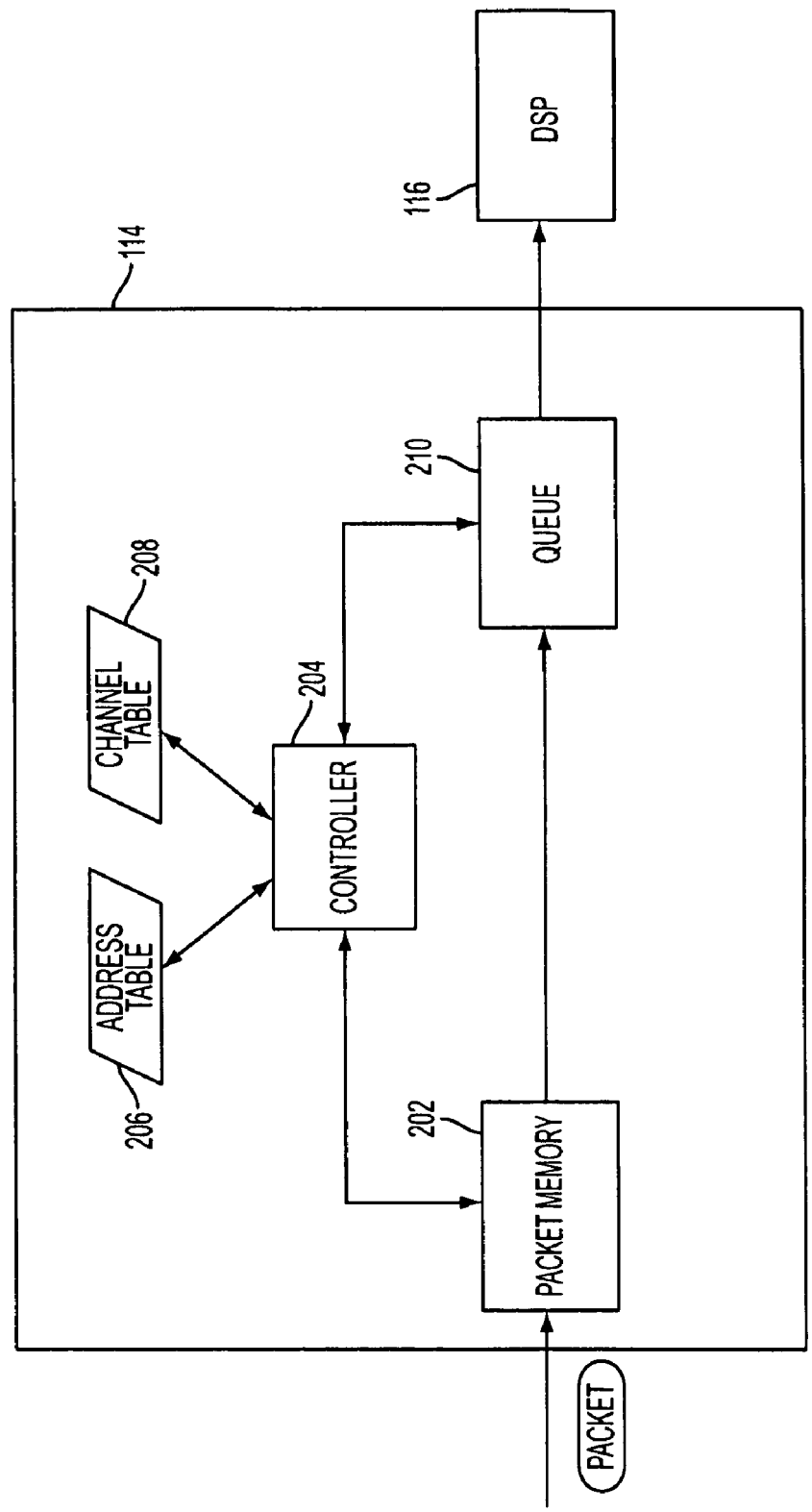
FIG. 2 is a functional block diagram of a real-time packet handler according to one embodiment.

Referring now to FIG. 2, FIG. 2 is a functional block diagram of real-time packet handler 114. Handler 114 may have a packet memory 202 for storing the packet received from packet offset memory 104. Handler 114 may also include a controller 204 that is configured to process the packet stored in memory 202.

Figure 3:
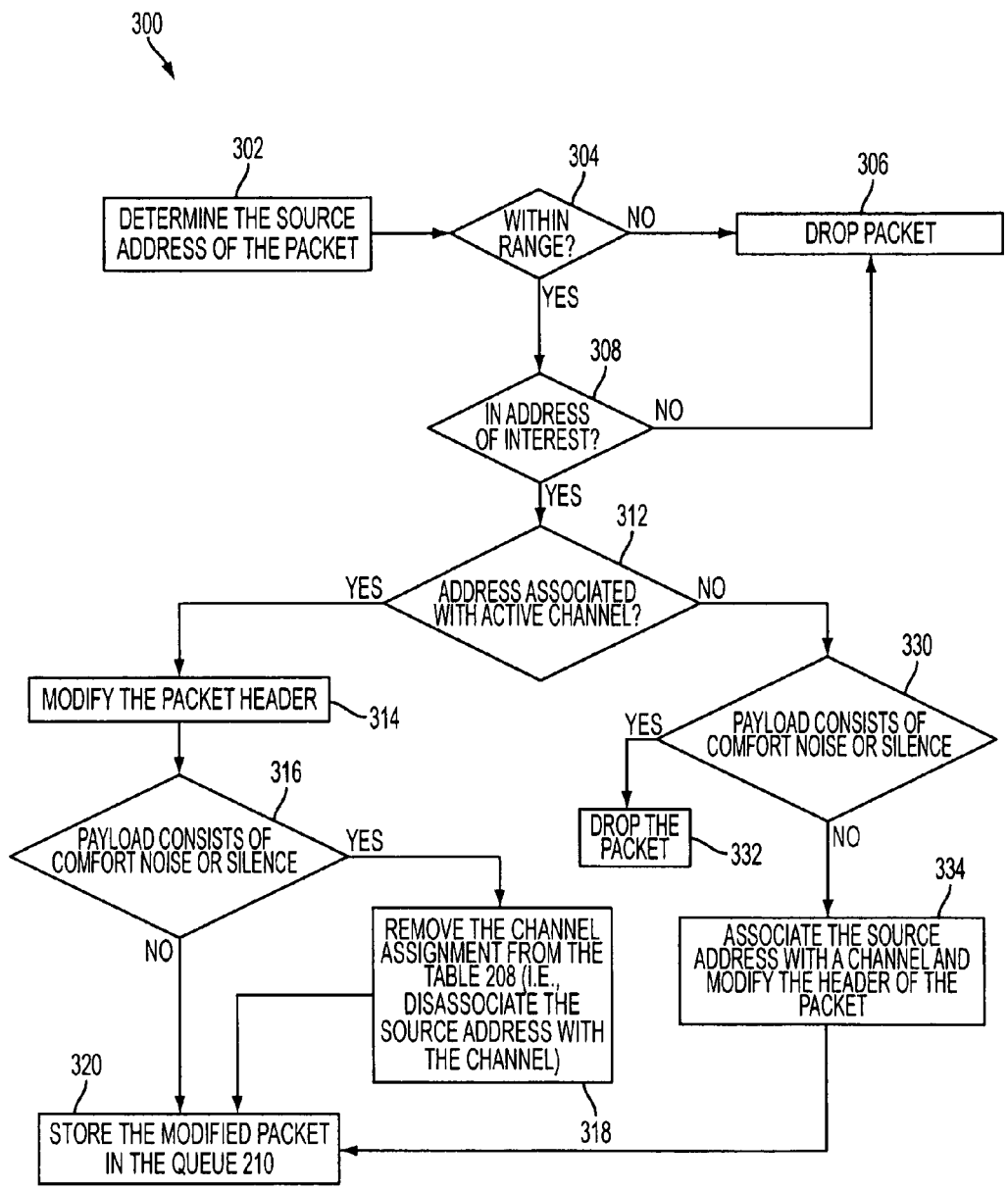
FIG. 3 is a flowchart illustrating a process according to one embodiment.

Referring now to FIG. 3, FIG. 3 is a flowchart illustrating a process 300 according to one embodiment that may be performed by controller 204. Process 300 may begin in step 302, where controller 204 determines the source address of the packet. In step 304, controller may determine whether the source address falls within a range of predefined addresses. For example, the range may include 65,536 addresses. If the determined source address is not within the range, then controller 204 may drop the packet (step 306). If the source address is within the range, then controller 204 may compare the source address to a table 206 that stores addresses of specific interest to an application or user (step 308). If controller 204 determines that there is no match between the source address and an address in table 206, then controller 204 may drop the packet (step 306).

If, on the other hand, controller 204 determines that the source address of the packet is included in table 206, then controller 204 will continue to process the packet (i.e., control may pass to step 312).

In step 312, controller 204 may determine whether the source address is associated with an active channel. For example, in some embodiments, a source address is associated with an active channel if the source address is stored in an active channels table 208. In some embodiments, there may be a limit to the number of active channels. For example, in one embodiments, the DSP 116 can process only 128 channels at a given point in time. Thus, in this embodiment, the number of active channels should not exceed 128. The active channels table maps source addresses to channel numbers.

If, in step 312, controller 204 determines that the source address is associated with an active channel, then process 300 may proceed to step 314. If, on the other hand, controller 204 determines that the source address is not associated with an active channel value, then process 300 may proceed to step 330.

In step 314, controller 204 modifies the header of the packet. For example, controller 204 may remove unnecessary information from the header (e.g., unnecessary RTP definitions are removed) and insert into the header the channel number that is associated with the source address of the packet. As discussed above, table 208 associates channel numbers with source addresses. That is, each source address stored in table 208 may be associated with a unique channel number. In some embodiments, after step 318, the header of the packet no longer contains all RTP definitions but only the channel assignment value and control bits.

In step 316, controller examines the payload of the packet to determine whether the payload consists of either comfort noise and/or silence. If controller 204 determines that the payload consists of either comfort noise and/or silence, then controller 204 may remove the channel assignment from the table 208 (step 318). That is, controller 204 may modify table 208 so that the source address of the packet is not associated with the value of an active channel.

If controller 204 determines that the payload includes something other than comfort noise and/or silence, then process 300 may proceed to step 320. Additionally, process 300 proceeds to step 320 after step 318.

In step 320, the now completely formed but modified packet header and payload is then stored in a queue 210. Queue 210 may include one or more first-in, first-out (FIFO) queues. For example, in some embodiments, queue 210 includes two FIFO queues so that while controller 204 writes a packet to one of the queues the DSP 116 can read a packet from the other queue.

In some embodiments, the packet or a portion of the packet (e.g., the packet payload) being processed by controller 204 is encrypted. In such embodiments, table 206 or 208 may associate each source address in the table with a key that is used to decrypt the packet. In this embodiment, before controller 204 writes a packet to queue 210, controller 204 uses the key associated with the source address of the packet to decrypt the packet or portion thereof that is encrypted.

Referring now to step 330, in step 330 controller 204, controller 204 examines the payload of the packet to determine whether the payload consists of either comfort noise and/or silence. If controller 204 determines that the payload consists of either comfort noise and/or silence, then controller 204 may drop the packet (step 332).

If controller 204 determines that the payload includes something other than comfort noise and/or silence, then process 300 may proceed to step 334.

In step 334, controller 204 associates the source address with a channel and modifies the header of the packet. For example, controller 204 may remove unnecessary information from the header and insert into the header the channel number that is associated with the source address of the packet. In some embodiments, after step 334, the header of the packet no longer contains all RTP definitions but only the channel assignment value and control bits. After step 334, control may pass to step 320.

In preferred embodiments of the invention, modules 102, 106 and 114 are implemented in hardware, but this is not a requirement. For example, modules 102, 106 and 114 may be implemented using one or more field programmable gate arrays (FPGAs) and/or application specific integrated circuits (ASICs). Additionally, protocol stack 112 is preferably implemented in software that executes on a general purpose processor (e.g., a RISC process or other processor).

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and some steps may be performed simultaneously.

What is claimed is:

1. A system for processing packets containing real-time audio and/or video data, comprising:
   a media access control layer module for receiving packet data from a network;
   a packet memory for storing the packet data received from the network, the packet data including packet header data;
   a real-time packet handler;
   a protocol stack processor executing a protocol stack;
   a digital signal processor; and
   a packet header test module that examines the packet header data to determine whether the packet header data indicates that the payload associated with the packet header contains real-time data, wherein the header test module routes the packet data to the protocol stack processor if the module determines that the packet header does not indicate that the payload contains real-time data and routes the packet data to the real-time packet handler if the module determines that the packet header indicates that the payload contains real-time data, wherein
   the real-time packet handler comprises a controller for filtering and processing the packet data and a queue, coupled to the digital signal processor, for storing the filtered and processed packet data,
   the real-time packet handler is configured to (a) determine a source address included in the packet data, (b) determine whether the source address is included in a list of source addresses; and (c) determine whether the source address is associated with an active channel, wherein the real-time packet handler modifies the packet data and stores the modified packet data in said queue if the source address is associated with an active channel and the source address is included in said list of source addresses, and the real-time packet handler is configured to drop the packet data if the source address is not associated with an active channel or the source address is not included in said list of source addresses, and
   the real-time packet handler modifies the packet data by inserting into the packet header data a channel number of the active channel associated with the source address included in the packet data.

2. The system of claim 1, wherein the handler is further configured to determine whether the payload of the packet data consists of comfort noise and/or silence.

3. The system of claim 2, wherein, if a data structure associates the source address with an active channel and if the handler determines that the payload of the packet data consists of comfort noise and/or silence, then the handler modifies the data structure so that the source address is not associated with the active channel.

4. The system of claim 2, wherein, if a data structure does not associate the source address with an active channel and if the handler determines that the payload of the packet data does not consist of comfort noise and/or silence, then the handler modifies the data structure so that the source address is associated with an active channel.

5. The system of claim 1, wherein the header test module is implemented using an FPGA.

6. The system of claim 5, wherein the real-time packet handler is implemented using an FPGA.

7. The system of claim 6, wherein the protocol stack processor that executes the protocol stack is a RISC or CISC processor.

8. The system of claim 1, wherein the handler determines whether the source address is associated with an active channel only after the handler determines that the source address is included in said list of source addresses.

9. The system of claim 1, wherein, prior to determining whether the source address is included in said list, said handler determines whether the source address is within a predetermined range of addresses.

10. The system of claim 1, wherein, prior to the modifying the packet data and storing the modified packet data in said queue, the handler decrypts at least a portion of the packet data using a key associated with the source address.

11. The system of claim 1, wherein, if a data structure does not associate the source address with an active channel and if the handler determines that the payload of the packet data does not consist of comfort noise and/or silence, the real-time packet handler is configured to drop the packet data.

12. The system of claim 1, wherein the packet header data of the modified packet data contains only (i) the channel number of the active channel associated with the source address included in the packet data and (ii) control bits.

13. The system of claim 1, wherein the real-time packet handler modifies the packet data by removing unnecessary information from the packet header data.

14. The system of claim 13, wherein the real-time packet handler modifies the packet header data by removing unnecessary real-time transport protocol definitions.

15. The system of claim 1, wherein the digital signal processor does not execute a protocol stack.

16. The system of claim 1, wherein the protocol stack processor is a TCP/IP protocol stack processor executing a TCP/IP protocol stack, and the digital signal processor does not execute a TCP/IP protocol stack.

17. A method for processing packets containing real-time audio and/or video data, comprising:
   (a) receiving, by a media access control layer module, packet data from a network, and storing, by a packet memory, the packet data received from the network, the packet data comprising packet header data and packet payload data;
   (b) examining, by a packet header test module, the packet header data;
   (c) determining, by the packet header test module, whether the packet payload data includes real-time data based on the packet header data;
   (d) providing the packet data to a protocol stack processor running a protocol stack if the packet payload data does not include real-time data; and
   (e) providing the packet data to a real-time packet handler if the packet payload data includes real-time data then,
   (f) storing, by a real-time packet handler, the packet data in a queue of the real-time packet handler that is coupled to a digital signal processor if the packet data passes through a filter and a source address included in the packet data is associated with an active channel;
   (g) storing, by the real-time packet handler, the packet data in said queue if (1) the packet data passes through said filter, (2) the source address included in the packet data is not associated with an active channel and (3) a payload of the packet data does not consist of comfort noise and/or silence;

(h) discarding, by the real-time packet handler, the packet data if (1) the payload of the packet data consists of comfort noise and/or silence and (2) the source address included in the packet data is not associated with an active channel; and (i) reading and processing, by the digital signal processor, the packet data stored in said queue, wherein method further comprises modifying, by the real-time packet handler, the packet data before the packet data is stored in the queue, and the real-time packet handler modifies the packet data by inserting into the packet header data a channel number of the active channel associated with the source address included in the packet data.

18. The method of claim 17, wherein step (f) is performed regardless of whether the payload of the packet data consists of comfort noise and/or silence.

19. The method of claim 17, wherein the packet data passes through said filter if the source address included in the packet header data is included in a list of addresses.

20. The method of claim 17, wherein the packet data passes through said filter if the source address included in the packet header data is included in a list of addresses and is within a predetermined address range.

21. The method of claim 20, further comprising: dropping the packet data if the packet data does not pass through said filter.

22. The method of claim 17, further comprising determining, by the real-time packet handler, whether the packet payload data consists of comfort noise and/or silence.

23. The method of claim 22, wherein, if the packet payload data consists of comfort noise and/or silence and a data structure associates the source address with an active channel, then the method further includes modifying the data structure so that the data structure does not associate the source address with an active channel.

24. The method of claim 22, wherein, if the packet payload data includes voice data and a data structure does not associate the source address with an active channel, then the method further includes modifying the data structure so that the data structure associates the source address with an active channel.

25. The method of claim 17, wherein said queue comprises one or more first-in, first-out queues.

26. The method of claim 17, wherein the packet header data of the modified packet data contains only (i) the channel number of the active channel associated with the source address included in the packet data and (ii) control bits.

27. The method of claim 17, wherein the modifying the packet data further comprises removing unnecessary information from the packet header data.

28. The method of claim 27, wherein the real-time packet handler modifies the packet data by removing unnecessary real-time transport protocol definitions.

29. The method of claim 17, wherein the digital signal processor does not run a protocol stack.

30. The method of claim 17, wherein the protocol stack processor is a TCP/IP protocol stack processor running a TCP/IP protocol stack, and the digital signal processor does not run a TCP/IP protocol stack.

* * * * *